March 30, 1948.　　A. R. GOLDSBY ET AL　　2,438,852
MULTISTAGE ALKYLATION METHOD
Filed Jan. 23, 1945　　2 Sheets-Sheet 2
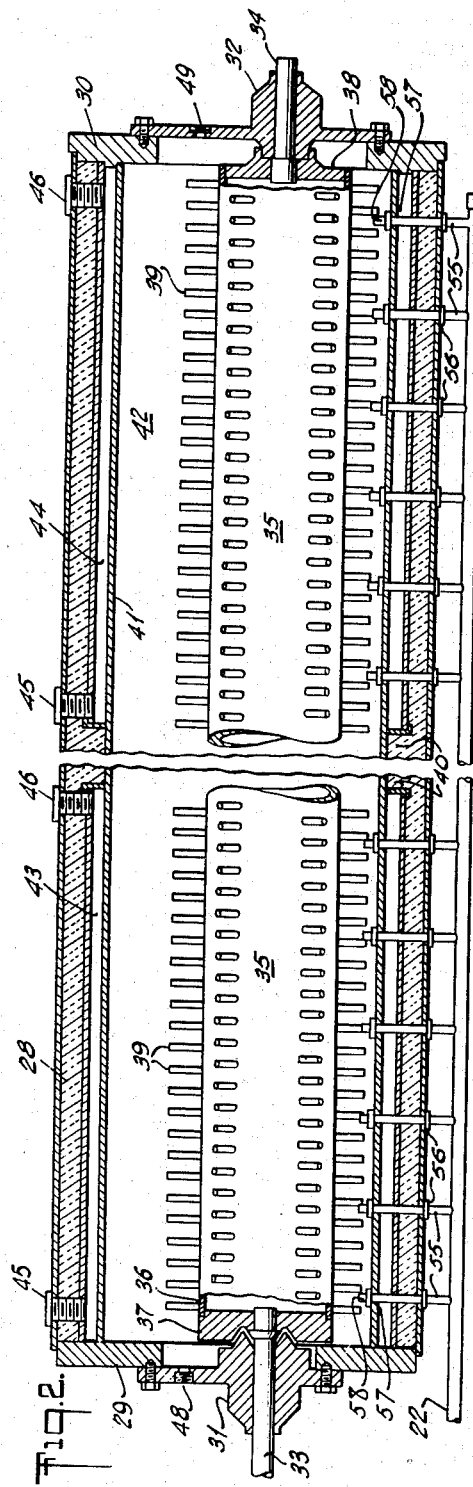
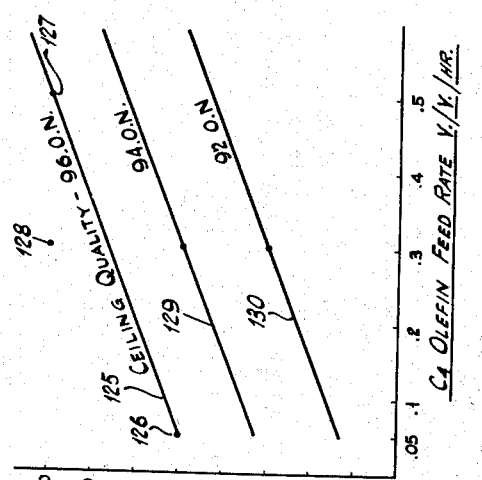
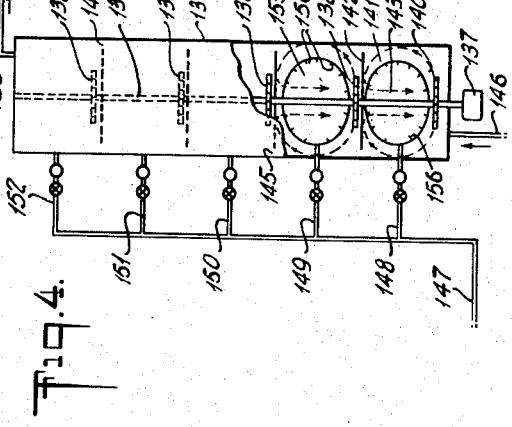
INVENTORS
ARTHUR R. GOLDSBY.
CLAUDE W. WATSON.
BY
ATTORNEY Patented Mar. 30, 1948

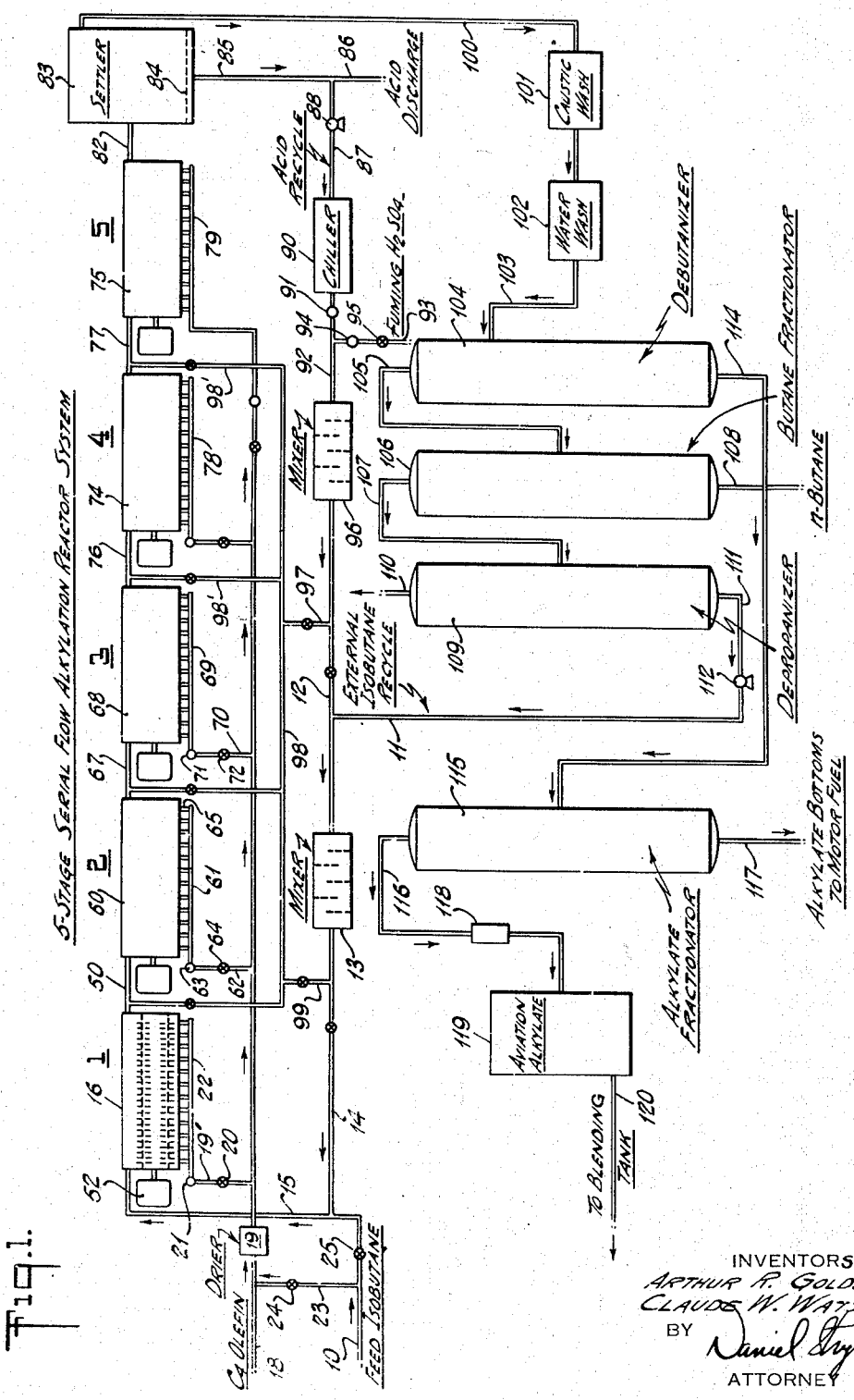

2,438,852

UNITED STATES PATENT OFFICE 2,438,852

MULTISTAGE ALKYLATION METHOD

Arthur R. Goldsby, Beacon, and Claude W. Watson, Eastchester, N. Y., assignors to The Texas Company, New York, N. Y., a corporation of Delaware Application January 23, 1945, Serial No. 574,136

4 Claims. (Cl. 260—683.4)

This invention relates to catalytic alkylation of an organic compound having a replaceable hydrogen atom with an alkylating agent, and more particularly of a paraffin having a tertiary carbon atom, such as isobutane, with an olefin, for the production of gasoline hydrocarbons of high anti-knock value suitable for aviation gasoline and motor fuel. The invention is particularly adapted for the production of a superior alkylate suitable for aviation gasoline of high quality, which is designated as a super-fuel.

This is a continuation-in-part of our copending application Serial No. 476,896, filed February 24, 1943.

One of the principal objects of the invention is to improve the conventional catalytic alkylation process, such as the sulfuric acid alkylation process or the hydrofluoric acid alkylation process, to enable a superior quality of alkylate to be produced without sacrifice in capacity, to thereby meet the increased demand for aviation gasoline of the super-fuel type.

Another object of the invention is to provide a process for making ceiling quality alkylate in continuous commercial alkylation units in large capacity and with greatly improved catalyst life.

Still another object of the present invention is to provide an improved process for making alkylate of any desired quality below ceiling quality at increased capacity and with marked economy in both catalyst cost and isobutane recycle cost.

Another object is to provide improved apparatus for carrying out the foregoing methods.

Other objects and advantages of the present invention will be apparent from the following description when taken in conjunction with the attached drawing and appended claims.

The sulfuric acid alkylation process and also the hydrofluoric acid alkylation process are now widely used in the production of alkylate for the manufacture of 100 octane aviation gasoline. In these processes, a low-boiling isoparaffin, such as isobutane, is alkylated with a $C_4$ olefin or polymer thereof, a $C_5$ olefin, or mixtures of $C_4$ and $C_5$ olefins, in the presence of the catalyst to produce higher molecular weight isoparaffinic hydrocarbons within the gasoline boiling range and of high antiknock value, the resulting hydrocarbon product being known as alkylate. Various reactors, such as the pump and time tank reactor, jet type reactor, and impeller type of mixer, are used in these catalytic alkylation processes.

It is an objective in these catalytic alkylation processes to preferentially react the olefin with the isoparaffin to produce the desired alkylate and minimize side reactions of the olefin with itself or with the catalyst, which side reactions cause deterioration in the quality and yield of the product and reduce catalyst life.

In order to accomplish this objective, it is customary to use a hydrocarbon feed in which the isoparaffin is in substantial molar excess of the olefin, and also to recycle an emulsion of the catalyst with the hydrocarbon products within the reactor system in order to build up a very high ratio of isoparaffin to olefin at the point of initial contact of the olefin with the alkylation catalyst. Moreover, it is approved practice to fractionate and precondition the hydrocarbon feed and isoparaffin recycle stream to remove in part normal paraffin diluents and impurities, to maintain a high isoparaffin concentration in the hydrocarbon phase of the reacted mix, such as an isobutane concentration of at least 50% by volume, and sometimes as high as 60–70% where alkylate of higher clear octane is desired.

In these conventional alkylation units, the maintenance of very high isobutane concentration in the reacted mix represents one of the most expensive items of the process, due to the cost involved in the installation and operation of the fractionating equipment required for separating isobutane of the purity desired for recycling to the reaction zone. The demand for maximum capacity with available equipment has resulted in the past in the production of large volumes of a lower quality alkylate by the use of an intermediate isobutane concentration of the order of 40–60% by volume or lower. For example, in $C_4$ alkylation, many plants have preferred to operate to produce alkylate having a clear CFRM octane of about 89–93, since more octane barrels could be manufactured with conventional units in this manner than when operating to produce 94–96 octane alkylate. Moreover, the lower quality alkylate is satisfactory for the production of the conventional 100 octane aviation gasoline, such as the 100–130 grade, and the maximum amount of this grade of alkylate with the available isobutane supply has been produced in this manner. The "100–130" refers to Army and Navy performance numbers, the 100 performance number being an AFD–1C rating equivalent to iso-octane, and the performance number of 130 being an AFD–3C rating equivalent to S reference fuel + 1.3 ml. TEL/gal.

In order to produce aviation gasoline of the super-fuel type, such as 115–145 grade, it is advantageous to manufacture alkylate having a clear CFRM octane rating of about 94–96, which approaches ceiling quality. By "ceiling" quality is meant an alkylate which has been produced under those operating conditions which have been discovered to give the highest octane product from the particular isoparaffin and olefin undergoing reaction, such as about a 96 clear CFRM octane total alkylate from isobutane and butylene-2, and about a 94–95 clear CFRM octane total alkylate from isobutane and a mixed $C_4$ refinery fraction which is customarily termed a B—B feed. This requires substantially all operating conditions to be optimum.

In our mentioned copending application Serial No. 476,896, we have disclosed and claimed the feature of multipoint olefin feed in an alkylation reactor to avoid local accumulation of olefin in the catalyst. This involves the introduction of the olefin or other alkylating agent into the agitated or circulating stream of hydrocarbon and catalyst in finely divided form and at a large number of spaced points extending throughout a substantial portion of the volume of the mechanically agitated mix. By combining the feature of fine subdivision of the olefin with the finite spacing of the substantial number of points of olefin introduction, so as to prevent any substantial accumulation or buildup of olefin in any increment of the acid in the reaction mixture, local overheating and alkyl ester buildup in the acid catalyst are prevented, and objectionable side reactions are minimized. This enables the production from a $C_4$ feed in a single stage emulsion recycle unit of alkylate of about 94–95 clear octane with an isobutane concentration in the reacted mix of the order of 65–70% by volume, employing conventional olefin feed rates which are commercially practical to give desired capacity. However, this involves the increased expense of the high isobutane concentration; and such high isobutane concentration is not feasible in all plants where the supply of isobutane is limited or the required fractionating capacity is not available.

In the present application there are disclosed and claimed certain improvements, including the application of the multipoint olefin addition to each stage of a multistage system, wherein the bulk of the isobutane and catalyst is fed to the first stage to flow serially through the system, the olefin is split between the stages, and there is once-through flow without hydrocarbon or emulsion recycle from one stage to another, although there may be local internal recirculation within each stage. This enables an overall isobutane feed rate to be employed which will afford an isobutane concentration in the last stage of the system of around 50% by volume or less, while the isobutane concentration in the earlier stages is substantially greater. Consequently, the full value of the high isobutane concentration in the earlier stages of a multistage system of at least three stages, and preferably at least five stages, is secured with the same overall isobutane supply as required to maintain 50% concentration in conventional units.

In addition, there is disclosed and claimed herein the feature of controlling the olefin feed rate in each stage in accordance with the isobutane concentration in that particular stage, in combination with the multistage system employing multipoint olefin addition in each stage, as heretofore set forth. Careful experimental work has shown that, where other operating conditions are maintained constant and substantially optimum, there is a definite maximum olefin feed rate, expressed as volumes of olefin per volume of catalyst in the reactor per hour, which can be employed with a particular isobutane concentration to produce an alkylate approaching ceiling quality. With an isobutane concentration of about 65% and above, the allowable olefin feed rate exceeds about 0.3 v./v./hr. in $C_4$ alkylation for ceiling quality alkylate, which is about the rate heretofore normally employed in commercial units. Consequently, higher quality alkylate has been obtained in certain cases where other optimum operating conditions were used, and the isobutane concentration was maintained about 65% or above. However, at about 50% isobutane concentration, the maximum permissible olefin feed rate to give ceiling quality alkylate is much lower, and may be only about one-tenth of that at 80% concentration and one-sixth of that at about 65% concentration. This rate for lower than 65% isobutane concentration is substantially below the rate heretofore generally employed in commercial operation; and this coupled with the fact that the olefin was introduced from one or a few relatively large feed pipes causing local accumulation is a reason why lower octane alkylates have been secured in plants operating with 50–60% isobutane concentration with other operating conditions about optimum.

In accordance with the method of the present invention to produce an alkylate of approximately ceiling quality, a high isobutane concentration of the order of about 75–80% is maintained in the first stage, and there is employed a high olefin feed rate generally exceeding that normally employed in conventional operation but not exceeding the maximum rate of about 0.5 v./v./hr. permissible for that isobutane concentration to give ceiling quality alkylate, the olefin being added by multipoint addition to prevent local accumulation as heretofore described and which permits the higher olefin feed rate. In the second stage of the serial flow system, the isobutane concentration will of course be somewhat reduced and the olefin feed rate will be lowered to approach but not exceed the maximum permissible for the lower isobutane concentration to produce the ceiling quality of alkylate. The olefin feed rate will be further reduced progressively throughout the remaining stages in accordance with the isobutane concentration, until in the final stage an isobutane concentration of about 50% or somewhat less is available, and an olefin feed rate of the order of .05 v./v./hr. is employed in that stage to produce the final additional quantity of ceiling quality alkylate. In this manner, desired capacity of the alkylation plant is maintained, while a superior quality of alkylate is produced with a substantially lower overall isobutane requirement, and catalyst life is greatly improved.

While one of the principal objects of the present invention is to provide a commercially practical method for producing alkylate of approximately ceiling quality in large capacity, the invention is not so limited but can be employed to advantage in the production of lower octane alkylate below ceiling quality. In fact, the invention enables an alkylate of predetermined clear octane, such as 92 or 94 CFRM. octane, to be produced by regulating the olefin feed rate in accordance with the isobutane concentration throughout the various stages of the multistage unit as heretofore described, with very substantial advantages over the conventional and heretofore known processes. For example, the maximum permissible olefin feed rate for a given isobutane concentration is larger for the production of 94 octane alkylate than it is for 96 octane alkylate; and the maximum permissible olefin feed rate for the given isobutane concentration is still larger for the production of 92 octane alkylate. Consequently, the present invention can be used to substantially increase the capacity of a given plant to produce a lower grade alkylate, while maintaining the same external isobutane recycle, since a higher average olefin feed rate throughout the multiple stages is thereby permissible. Conversely, the invention can be utilized to substantially reduce the external isobutane recycle of the plant, while maintaining the capacity of the plant and quality of the alkylate.

Certain other optimum operating conditions were mentioned generally above. A large amount of experimental and development work has been conducted in connection with the sulfuric acid alkylation process, and to a lesser degree in connection with the hydrofluoric acid alkylation process; and the optimum conditions for $C_4$ and $C_5$ alkylation with the conventional emulsion recycle reactor systems are largely known. These conditions can of course be employed in connection with the present invention. It is also obvious that operating conditions approaching but below the optimum can also be used, and advantageous results secured by application of the principles of the present invention.

This invention is illustrated by way of example as applied to sulfuric acid alkylation. Conventional operating conditions for that process which can be employed are overall isobutane: olefin mol feed ratios of about 3:1 to 10:1 and preferably at least 5:1, with acid in the reactor having a titratable acidity of about 88-95% and preferably at least about 90%, an acid to hydrocarbon volume ratio of at least about 1:1, and a temperature of 30-60° F. and preferably about 40-50° F. As distinguished from the prior practice in this art, the $H_2O$ concentration of the acid in the reactor system is maintained below 4% and preferably below 1%, since the presence of larger quantities of water in the alkylation acid is found to have a deleterious effect on the quality and yield of the alkylate and on catalyst life. While predrying of the hydrocarbon feed has heretofore been proposed, this is not sufficient to maintain the water content within the low limits specified in continuous operation, since a substantial proportion of water is found to be produced from the alkylation process, possibly from side reactions which accompany the alkylation reaction and have not been entirely suppressed. The low water content of the system acid can effectively be maintained by the use of $SO_3$ or fuming acid added to the prechilled recycle acid in controlled amount as disclosed and claimed in the copending application of Arthur R. Goldsby and Claude W. Watson, Serial No. 574,137, filed of even date herewith and now Patent No. 2,437,091.

In addition, the present invention preferably departs from the prior practice in this art by the use of a higher ratio of acid to hydrocarbon in the reaction zone. While, as set forth above, about 50% by volume of acid on the total volume of the reaction mix has heretofore been generally employed, it is found advantageous in connection with the present invention to utilize a higher proportion of acid up to about 90% by volume and preferably about 65% by volume. It is also to be understood that the maximum acid to hydrocarbon ratio which can be tolerated for best results is a function of the mixing efficiency, and therefore depends upon the particular type of reactor used. The 65% ratio specified above is about maximum for the Stratco reactor and the pump and time tank reactor; but higher ratios can be employed with other types of reactors having higher mixing efficiency. Since the olefin feed rate depends upon the volume of catalyst in each stage, the use of a higher volume ratio of acid to hydrocarbon in each stage within the above limits enables a higher olefin feed rate to be employed with resultant increase in capacity. However, increasing the acid content above about 90% by volume in any stage reduces the amount of isobutane present in that stage, with the result that the olefin feed rate, which is also dependent on the isoparaffin concentration in the hydrocarbon phase, must also be reduced in order to maintain the desired isobutane concentration throughout the system. Consequently, for the conventional mixer such as an impeller type reactor, an optimum acid ratio of around 65% provides substantially the maximum average olefin feed rate for the system; and increasing or decreasing the acid ratio from that figure necessitates some reduction in overall olefin feed rate with corresponding reduction in the capacity of the plant. Consequently, an optimum range of about 60-70% of acid by volume is used to provide increased capacity of the plant, with about 65% being preferred.

The reaction products from the final stage of the system flow to a settler, where the acid catalyst separates from the hydrocarbon phase. Preferably, a minimum level of settled flat acid is maintained in the settler consistent with the operation of conventional automatic controls to prevent recirculation of hydrocarbon along with the recycled acid. A minor proportion of the settled acid is withdrawn from the system and replaced with white fresh makeup acid of preferably 99.5-100% $H_2SO_4$ concentration or a black acid having less than 0.5% water to avoid water dilution, where the fuming acid added to control the water content is not sufficient for makeup purposes to maintain the titratable acidity of the acid within the system at the desired figure. In some cases, the addition of non-fuming acid may be required to permit a larger proportion of settled acid to be discharged from the system to thereby get rid of organic matter, and thus prevent buildup of organic matter in the system. The major proportion of the settled acid is recycled to the reactor system, being first prechilled to a low temperature sufficiently below 40° F. so that the addition of the required $SO_3$ or fuming acid does not raise the temperature of the mixture above about 40° F. The hydrocarbon phase from the settler is caustic and water-washed and then fractionated in conventional manner, the excess isobutane being separated and recycled to the alkylation unit. Preferably, this recycle isobutane is in whole or part thoroughly mixed with the recycle acid before the mixture is returned to the first stage to flow serially through the alkylation system.

The present invention is more particularly illustrated in the attached drawing disclosing preferred embodiments thereof, and wherein Fig. 1 is a diagrammatic view of a multistage alkylation plant employing reactors of the eccentric rotor type and incorporating the principles of the present invention;

Fig. 2 is a vertical, sectional view through a reactor of Fig. 1, illustrating the construction thereof.

Fig. 3 is a graph illustrating the variation in olefin feed rate with isobutane concentration for various alkylate qualities or octane numbers in the alkylation of isobutane with butylene-2 with $H_2SO_4$ as the catalyst; and Fig. 4 is a diagrammatic view, partly in vertical section, of a modified tower type of reactor incorporating the principles of the present invention.

Referring to Fig. 1, feed isobutane from line 10 together with recycle isobutane from line 11 are mixed with recycle and makeup catalyst from line 12. As shown, the recycle isobutane, which constitutes the largest part of the isobutane supply, is first mixed with the catalyst in mixer 13, and this mixture then flows by line 14 to the point where the said isobutane from line 10 is added. The resulting intimate mixture then passes by line 15 to the inlet of the first reactor 16 of the five-stage serial flow alkylation reactor system disclosed.

$C_4$ olefin from line 18, which has preferably been caustic washed and then water washed, passes through a suitable drier 19, and thence is introduced by split feed into each of the reactors of the five-stage system. As shown, the olefin feed for the first reactor 16 passes by branch line 19' controlled by valve 20 and containing a suitable meter 21 to the manifold 22 which supplies the multipoint olefin feed system of the reactor. If desired, the said isobutane from line 10 can be split, a portion passing by branch line 23 controlled by valve 24 to the olefin feed line 18 such as to provide about a 1:1 or somewhat larger molar ratio of isobutane to olefin, and the balance passing under the control of valve 25 to mix with the stream from line 14 as heretofore described.

Referring more particularly to Fig. 2, the reactor comprises an elongated horizontal casing 28 formed of two concentric metal shells of circular cross-section with insulation filling the space therebetween, said casing being closed at opposite ends by heads 29 and 30 respectively. Head 29 carries a bearing 31 and head 30 carries a bearing 32 in which are mounted stub shafts 33 and 34 respectively carrying a hollow cylinder indicated generally by the numeral 35. The said cylinder comprises a hollow shell 36 equipped with heads 37 and 38 closing opposite ends thereof, the said heads being formed to provide sealing engagement with the bearings 31 and 32 respectively. The shell 36 is equipped with a series of horizontal rows of upstanding projections or pins 39, there being six rows of the pins as shown, although this can be varied, with each row containing a large number of closely spaced pins. As shown, the pins of one row are staggered with respect to the pins of an adjacent row.

Mounted within the shell 28 and supported from heads 29 and 30 and also from a centrally arranged annular boss 40 is an inner shell 41 confining an alkylation reaction space 42. Shell 41 also forms annular chambers 43 and 44 between the shell 41 and outer casing 28, through which refrigerant is circulated by inlet and outlet connections 45 and 46 respectively. Bearing plate 31 carried by head 29 is equipped with a threaded opening 48 adapted to receive the threaded end of pipe 15 for the supply of mixed isobutane and catalyst to the reaction chamber 42 of the reactor. Likewise, bearing plate 32 carried by head 30 is equipped with a threaded opening 49 adapted to receive the threaded end of a pipe 50 (Fig. 1) serving as an outlet for the reaction products of reactor 16 and leading those products to the inlet of the second reactor of the series. As shown in Fig. 1, shaft 33 is directly connected to a motor 52 for rotating the agitator 35, although any other suitable means of driving the rotor at about 200–800 and preferably about 600 R. P. M. can be employed.

The bearings 31 and 32 are offset from the central axis of the casing 28, so that the rotary agitator 35 is eccentrically mounted within the reaction space 42. As shown, the protruding pins 39 approach closely to the interior shell 41 at the bottom of the reaction space 42, and are spaced farthest from the said shell 41 at the upper portion of said reaction space. Rotation of the eccentrically mounted rotor at a high rate of speed causes the pins to churn up the liquid contents within the reaction space 42 to produce a violent agitation thereof, forcing the liquid to move at high velocity about the interior wall of shell 41. This agitation is most intense adjacent the lower portion of the reaction space 42 where the pins 39 approach most closely to the wall of shell 41. At the same time, supply of charge stock to the reaction space causes a progressive movement of the agitated liquid contents along the length of the reactor. This longitudinal movement is quite slow in comparison to the movement of the liquid contents about the cylindrical wall 41, which latter functions as a heat transfer surface to effect an indirect heat exchange between the reaction products within space 42 and the refrigerant within annular chambers 43 and 44.

The header 22 for the olefin feed communicates with a plurality of pipes or nozzles 55, shown as twelve in number and equally spaced along the length of the bottom of the reactor. It will be understood that this number and arrangement of nozzles can be varied in accordance with the principles of multipoint olefin addition and is merely shown by way of example. Each pipe 55 passes through a suitable opening in the wall of shell 28, which is sealed by a suitable packing gland and stuffing box indicated generally at 56. Likewise, each pipe 55 passes through a suitable opening in the wall of shell 41 which is sealed by a packing gland and stuffing box indicated at 57. The end of the pipe carries a nozzle tip 58 which preferably protrudes a slight distance into the interior of the reaction space 42, but is located without the circumscribing circle of the pins 39 to avoid contact therewith.

It will thus be seen that the olefin is injected at spaced points along the zone of maximum agitation within reaction space 42 which further contributes to the efficiency of the multipoint olefin addition. The nozzle tip 58 of each pipe 55 is preferably provided with an opening or orifice of about $\frac{1}{32}$ to $\frac{1}{4}$ inch in diameter and preferably about one-eighth of an inch. While a small opening is preferred so that the olefin is introduced in very small droplets, the opening should be large enough to avoid plugging, and this determines the diameter thereof. Protruding of the nozzle tip slightly within the shell 41, coupled with the sweeping action of the liquid products thereover under the influence of the efficient agitation set up by rotor 35, further contributes to the prevention of plugging. The olefin feed in manifold 22 is supplied under sufficient pressure to overcome the pressure drop through pipes 55 and nozzle tips 58 and produce a jetting effect into the interior of the reaction space 42. This further assists in the dispersion of the olefin to prevent local accumulation.

The number and spacing or arrangement of the pipes 55 will be determined by the volume of the reaction space 42. Generally, for multipoint olefin addition in a reactor of this type providing highly efficient agitation, there should be an olefin addition point for each 3 to 50 gallons of reaction mix, and preferably as many points as is practical while avoiding plugging and maintaining a definite pressure drop of the order of 5 pounds differential which will frequently give one point for each 10-15 gallons, with the points spaced from each other a substantial distance and preferably uniformly throughout a substantial portion to all of the reaction space. It will be appreciated that, in a multistage system of this character, the volume of each reactor can and should be substantially reduced over that employed in a single stage reaction system of the same capacity. Due to the smaller reaction volume and the efficient agitation, spaced olefin injection points along a line at the bottom of the reactor are feasible and desirable, so that each point is located in a zone of maximum or highly efficient agitation. Generally about 10-20 olefin injection points per reactor will be sufficient in a system of this character; although it will be understood that in larger volume units where a larger number of injection points are required, they not only can be spaced along the length of the reactor but also staggered around the reactor so as to provide a spacing of at least about 6 inches to 1 foot or more between injection points in all directions. Wherever the expression "multipoint olefin injection" or a similar expression is used throughout the description and claims, it will be understood that this means the addition of olefin in finely divided form through a substantial number of small openings in excess of five, which are spaced from each other throughout a large extent of the reaction zone of a single reactor, in order to prevent local accumulation of olefin at the interface or in the acid phase of the reaction mix as heretofore set forth.

Since the total volume of the reaction mix within the reactor space 42 is known, and also the acid to hydrocarbon volume ratio of the mix, the total amount of olefin to be introduced into this reactor per hour can be readily calculated in order to provide the desired "acid loading" rate, which expression is applied to the volume of olefin added per volume of catalyst per hour. As pointed out above, this acid loading is regulated in accordance with the isobutane concentration in the hydrocarbon phase of the reaction mix to produce alkylate of the octane level desired. Assuming a 6:1 isobutane to olefin feed ratio to the reactor 16, with a $C_4$ olefin feed from line 18 which contains approximately 50% by volume of olefin, then the isobutane concentration in the hydrocarbon phase of the reaction mix in this first stage will be roughly about 75%. For ceiling quality alkylate, an acid loading rate of about 0.4 v./v./hr. is permissible. The rate of feed of olefin to manifold 22 is therefore regulated by valve 20 in accordance with the reading of meter 21 to provide the desired acid loading; and this olefin is distributed by multipoint addition through the pipes 55 and nozzle tips 58 into the reaction space. The rate of distribution through these various nozzles is preferably maintained rather uniform throughout the series of multipoint openings for any reactor, although this can be varied somewhat without interfering with the desired operation so long as local accumulation is avoided. In this manner, a single control to the multipoint manifold of each reactor is sufficient, and it is not necessary to provide individual control of the olefin feed rate through the individual nozzles 55 of any reactor.

The reaction products from reactor 16 discharge through outlet 49 and pipe 50 in accordance with the feed rate to that reactor, and flow through the inlet into the reaction space of the second stage reactor 60. This reactor is constructed similarly to the reactor 16, and is provided with an olefin feed manifold 61 supplied by branch pipe 62 containing meter 63 and control valve 64. The manifold 61 supplies a plurality of nozzles 65 discharging by multipoint addition into the reaction space of reactor 60 in the manner previously described. The average isobutane concentration in this reactor may be approximately 65% by volume. The acid loading in this reactor is therefore reduced in accordance with the lower isobutane concentration. Consequently, in this reactor the acid loading rate may be about 0.25 v./v./hr.

Reaction products overflowing from the second reactor pass by line 67 to the third stage reactor 68 equipped with its olefin feed manifold 69 supplied by branch pipe 70 containing meter 71 and control valve 72. In this reactor, the isoparaffin concentration may be about 57%, and the acid loading rate about 0.17 v./v./hr. The fourth and fifth stage reactors 74 and 75 are constructed similarly and connected by pipes 76 and 77 for serial flow of the mixed isoparaffin-alkylate-acid, and for multipoint olefin addition from manifolds 78 and 79 respectively controlled by meters and valves as shown. The isobutane concentration in reactors 74 and 75 may be approximately 53% and 50% respectively, with acid loadings of about 0.10 and 0.05 respectively. This provides an average acid loading rate for the five stage system of about 0.2. Assuming 65% by volume of acid in the reaction mix in comparison to the conventional 50%, the average olefin feed rate is thus approximately equal to that conventionally used, and the capacity of the plant is thereby maintained.

It will be understood that the above figures for isobutane concentration and acid loading are given by way of example, and these can be varied substantially within the scope of the present invention. While the above figures are set forth for alkylate of approximately ceiling quality, it will be understood that higher acid loading rates can be used for lower quality alkylates below ceiling grade. In any case, the acid loading rate will be varied and progressively reduced from stage to stage in accordance with the isobutane concentration within each stage. Moreover, while a five-stage system has been illustrated, it is to be understood that any number of stages within reasonable limits may be employed, so long as there are at least three. Substantial additional benefit is secured by increasing the number of stages from three to five; but increase of the number of stages much above five does not result in a comparable improvement justifying the additional installation expense. Moreover, while a series of reactors of the eccentric rotor type have been specifically disclosed, the invention is applicable to the use of other types of reactors in series, such as a series of impeller type mixers, a series of pump and time tank reactors, or a series of other mixers provided with mechanical agitation of a highly efficient type. Multipoint olefin addition in these various types of reactors can be accomplished by the use of a manifold supplying a plurality of nozzles spaced throughout a substantial portion of the reactor space in accordance with the foregoing principles, and as more particularly described in our mentioned copending application Serial No. 476,896.

Reaction products overflowing from the fifth stage reactor 75 pass by line 82 to settler 83 where hydrocarbon phase separates from acid phase. As shown, a low or minimum level 84 of settled flat acid is preferably maintained in the settler 83, since this is found to prevent deterioration in the quality of the alkylate and improve catalyst life. Therefore, only a sufficient flat acid level is maintained within the settler as to avoid discharge of hydrocarbon along with the acid removed by bottom line 85, and which is consistent with proper operation of conventional automatic controls. A minor proportion of the acid from line 85 is discharged by line 86 to recovery, and the major proportion is recycled by line 87 and pump 88 for return to the alkylation system.

The recycle acid is first passed through a chiller 90 where the temperature is lowered to about 30° F., for example. The chilled acid then flows through a meter 91 in line 92, where a stream of SO$_3$, preferably in the form of fuming acid containing about 20% free SO$_3$, is added by line 93 containing meter 94 and control valve 95. By sampling the acid discharged by line 86 from time to time, the water content thereof can be determined. The amount of fuming acid added by line 93 is then controlled to reduce the water content below 4% by weight and preferably below 1% by weight. Care is taken to avoid adding an excess of SO$_3$ over the water content of the recycle acid, so that free SO$_3$ is not present in the reaction zone. The extent of chilling of the recycle acid in chiller 90 is regulated so that the heat of reaction and dilution of the added fuming acid with the recycle acid stream does not raise the temperature of the mixture above about 40° F. Effective mixing and reaction of the SO$_3$ with the recycle acid to reduce the water content is facilitated by passage through mixer 96, the resulting fortified recycle acid then returning by line 12 to be mixed with the isobutane recycle from line 11 as heretofore described. If desired, a portion of the recycle acid unmixed with isobutane can be passed by valve controlled line 97 to header 98 which in turn connects to valve controlled branch lines 98', the latter opening into the connecting lines 50, 67, 76 and 77 respectively. Or preferably a portion of the recycle acid after mixing with the isobutane can be passed by valve controlled line 99 to header 98 and thence by the branch lines 98' to the reactors for stages 2–5 inclusive. In this manner, the acid to hydrocarbon ratio in the various stages can be independently controlled and varied.

The hydrocarbon phase from settler 83 is withdrawn by line 100 and is subjected to a caustic wash in 101 and then a water wash in 102 in conventional manner. The resulting neutralized hydrocarbons pass by line 103 to debutanizer 104, where normal butane and lighter is removed overhead by line 105 and passed to butane fractionator 106. Here isobutane and lighter is removed overhead by line 107 and normal butane is discharged by bottom line 108. The overhead stream passes to depropanizer 109, where propane and any lighter is removed overhead by line 110, and the purified isobutane removed as bottoms by line 111 and passed by pump 112 to the recycle line 11 for mixing with the acid recycle stream as heretofore described.

The debutanized alkylate is removed from debutanizer 104 by bottom line 114 and passed to the alkylate fractionator 115, where the desired aviation alkylate fraction is removed overhead by line 116, and alkylate bottoms suitable for motor fuel are discharged by line 117. The overhead stream passes through condenser 118 to aviation alkylate accumulator 119, from which the aviation gasoline may be withdrawn by line 120 to suitable blending tanks (not shown) in conventional manner.

Fig. 3 discloses a graph in which the acid loading or olefin feed rate in volume per volume of catalyst per hour is plotted against the isobutane concentration in volume per cent. The particular graph disclosed is for isobutane-butylene-2 alkylation with sulfuric acid as the catalyst. It will be understood that similar graphs are prepared for other isoparaffins and olefins, as well as for other alkylation catalysts, by carrying out experimental runs to determine several points on each curve for the reactants in question. Different curves or lines are plotted on the graph for the particular reactants and catalyst to represent different alkylate qualities or clear octane numbers. As shown, the curve for ceiling quality alkylate of approximately 96 CFRM octane is the line 125 determined by the points 126 and 127 respectively. Point 126 represents the maximum permissible acid loading for 50% isobutane concentration, which was determined to be approximately .05. Point 127 represents the maximum permissible acid loading to produce ceiling quality alkylate for 80% isobutane concentration, and this was determined to be approximately 0.5. Points on the chart above and to the left of line 125 represent operating conditions for isobutane concentration and acid loading rate which will produce ceiling quality alkylate with the other specified optimum operating conditions in sulfuric acid alkylation of isobutane with butylene-2. For example, point 128 representing 80% isobutane concentration with an acid loading rate of 0.3 means that this condition is substantially better than required to give ceiling quality alkylate. Therefore, as a practical matter, operating conditions will be selected for the various stages which will closely approach line 125 but may be somewhat above and to the left thereof.

Line 129 represents the curve for 94 clear octane alkylate with the isobutane-butylene-2 reactants in the presence of sulfuric acid catalyst. This shows that the acid loading rate for this lower quality alkylate can be substantially increased for a given isobutane concentration over that required to produce ceiling quality alkylate. Also, the curve for 92 octane number alkylate is indicated at 130 for these reactants. It will be noted that these lines are approximately parallel, which means that the determination of one point on a curve for a given intermediate quality alkylate may be sufficient to determine the location of that line, assuming that several points have been determined for another octane level curve; such as for the ceiling quality alkylate.

While in the systems described above, the various stages of the alkylation system have been physically separated, this is not necessary. A long closed reaction zone may be provided in which the individual stages are confined within a single casing or tower, and partially separated by baffles or partitions so that each stage can be provided with local internal recirculation or efficient agitation, and limited communication for series flow from one stage to another is also afforded.

This is illustrated in Fig. 4 which discloses a tower type of reactor 135 carrying a central shaft 136 driven by motor 137. Shaft 136 carries a series of agitators 138, which may preferably be in the form of impellers adapted to create internal recirculation by forcing the liquid outwardly from the impeller as indicated by line 140 to contact the wall of the tower and thence upwardly and inwardly as indicated at 141 to contact a circular partition 142. The circuit is then completed by the suction effect of the impeller drawing the liquid down through the central portion of the tower as indicated at 143 to the interior of the impeller, when the cycle is repeated. Each partition 142 is preferably spaced from the wall of the tower about a portion of the circumference thereof as indicated at 145 to provide openings for restricted communication between the various stages as thus formed. The mixed isoparaffin and catalyst is introduced into the bottom stage by line 146. The olefin feed is in turn introduced by line 147 containing a plurality of valve controlled branch lines 148—152, each branch line being equipped with a suitable meter. Each branch line in turn communicates with a manifold 155 containing a plurality of spaced orifices or nozzles 156 providing multipoint olefin addition through a substantial portion of the volume in each stage. It is to be understood that suitable cooling means (not shown) is provided for each stage or compartment of the tower reactor. The operation of the modification of Fig. 4 is otherwise the same as that previously described, reaction products discharging from the last stage by line 158 to a suitable settler and other equipment as shown in Fig. 1. If desired, two or more reaction towers of this type can be connected in series by connecting the top of the first tower with the bottom of a succeeding tower, to thereby conveniently provide a larger number of stages without unduly increasing the height of the tower.

The present invention is applicable to the alkylation of any organic compound having a readily replaceable hydrogen atom with an olefin or other suitable alkylating agent. As stated above, the invention is of particular importance in the alkylation of an isoparaffin or other paraffin hydrocarbon having a tertiary carbon atom in the molecule, to enable a superior quality of aviation alkylate to be produced in large capacity. But the principles of the present invention are applicable to the alkylation of a normal paraffin, a naphthene or cyclo-paraffin and an aromatic hydrocarbon. In place of olefins as the alkylating agent, various alkyl esters, such as the sulfates, chlorides, fluorides, etc. may be used. For example, the present invention can be employed in a two stage absorption-alkylation process, wherein the olefin is absorbed in acid in the first stage to produce the corresponding alkyl ester, and the ester either in solution in the absorbing acid or after separation therefrom as by isobutane or alkylate extraction, is then alkylated in the second stage by split feed of the ester to multiple reactors or alkylation zones, with multipoint addition in each reactor or zone in accordance with the principles set forth above. Moreover, various aliphatic alcohols and ethers which are capable of forming olefins on reaction, such as tertiary butyl alcohol, isopropyl alcohol, butyl ether, etc. may be employed as the alkylating agent, particularly with catalysts which have tolerance for water liberated in the reaction. The expression "alkylating agent" is used herein throughout the description and claims to denote any of the above compounds which react with the isoparaffin or other organic compound having a replaceable hydrogen atom in this alkylation reaction to produce alkylated hydrocarbons.

While the present invention has been described above as applied particularly to the use of sulfuric acid or hydrofluoric acid as the catalyst, it is to be understood that any other suitable and conventional alkylation catalyst can be employed, such as aluminum chloride-hydrocarbon complex, $BF_3 \cdot H_2O$, chlorosulfonic acid, fluorosulfonic acid and the like. The various conditions for the reactions employing these catalysts are well-known, and conventional conditions coupled with the features of the present invention as set forth above may be used.

While from the present commercial standpoint, the present invention is particularly applicable to the alkylation of isobutane with a $C_4$ olefin or a $C_4$ refinery fraction containing mixed butylenes, it is to be understood that the invention is applicable to the alkylation of any low-boiling isoparaffin with any normally gaseous or normally liquid olefin. Thus, the isoparaffin may be isobutane, isopentane, or isohexane. The olefin may be ethylene, propylene, butylenes, pentylenes, hexylenes, other higher boiling monomeric olefins or certain selected fractions of cracked naphthas, olefin polymers such as diisobutylene, tri-isobutylene, cross-polymers of isobutylene and normal butylene, such as codimer, and various mixed or non-selective polymers.

While contact times of the order of about 20–60 minutes are generally used in a multistage system of this character, it is to be understood that shorter contact times down to about 1–5 minutes may be employed particularly with the high acid to hydrocarbon ratios, thorough mixing of isobutane with recycle and makeup acid, and accelerated settling as by the aid of a centrifuge. Moreover, power requirements may be reduced, since the need for high velocities of flow of the recirculating stream in each stage is lessened by the multipoint olefin addition. Further, while positively directed recirculation in each stage may be employed, this is not essential as is evident from the reactor of the eccentric rotor type, since efficient mechanical agitation producing heterogeneous flow or movement about the reactor space is quite satisfactory.

While in the preferred embodiment described above, the bulk of the catalyst is introduced along with the isoparaffin into the first stage to flow serially through the multistage system, this can be modified by introducing only a portion of the catalyst into the first stage and then introducing additional quantities of catalyst into succeeding stages with independent control of the catalyst to hydrocarbon ratio in the individual stages by means of the valve controlled branch lines previously described. Moreover, while in the preferred embodiment the catalyst flows serially through the system along with the hydrocarbons at about the same rate, and a major proportion of the settled catalyst from the last stage is recycled, thereby maintaining a rather even catalyst activity or titratable acidity throughout the multiple stages, this can be modified in accordance with the present invention. Thus, the multistage system can be operated with catalyst holdup in the individual stages, so that the hydrocarbons flow through the system at a substantially faster rate than the catalyst, with the result that the bulk of the catalyst settled from the last stage of the system is substantially spent and can be passed directly to recovery. In this case, only sufficient settled catalyst is recycled to the system along with fuming acid makeup to control the water content of the catalyst in the various stages; and this is preferably accomplished by splitting the catalyst recycle together with added fuming acid between the individual stages so that water produced in the reaction in subsequent stages of the system will also be reduced to the desired minimum. Also, in this case, the required 99.5-100% $H_2SO_4$ or other makup catalyst needed to control the organic content of the catalyst in the system, is preferably added in the first stage. In this manner, a catalyst activity gradient may be maintained throughout the system, varying from a maximum activity such as 98% $H_2SO_4$ in the first stage to a minimum activity such as 90% $H_2SO_4$ or less in the final stage. The catalyst holdup in the individual stages can be accomplished in any suitable manner, such as by the provision of reactors in which partial settling is permitted in the upper portion or space from which the emulsion stream is overflowed or discharged to the next stage in series, whereby hydrocarbon-enriched emulsion thus passes from stage to stage and the bulk of the catalyst or acid is retained in each individual stage. Also, in a system where recycle catalyst is introduced into the individual stages with independent control of the catalyst to hydrocarbon ratio, this ratio may be progressively varied or reduced from stage to stage. For example, the reaction mix in the first stage operating with the highest acid loading rate may contain about 65-75% acid by volume; and this ratio may be progressively reduced in succeeding stages until in the final stage, operating with the lowest acid loading rate, the acid content of the reaction mix may be approximately 50% by volume.

Obviously many modifications and variations of the invention, as hereinbefore set forth, may be made without departing from the spirit and scope thereof, and therefore only such limitations should be imposed as are indicated in the appended claims.

We claim:

1. In the alkylation of a paraffin having a tertiary carbon atom in the molecule with an alkylating agent in the presence of an alkylation catalyst, the method which comprises introducing the major portion of the said paraffin together with the alkylation catalyst into the first stage of a multistage alkylation system and flowing the same serially through the system, splitting the feed of the said alkylating agent between the various stages, introducing the alkylating agent into each stage by multipoint addition involving injection of the alkylating agent in finely-divided droplets not exceeding ¼ inch in diameter from a large number in excess of five injection points spaced widely from each other and throughout a major portion of the reaction mix of each stage, and controlling the rate of addition of alkylating agent to each stage in accordance with the said paraffin concentration in the reactor hydrocarbon of each stage.

2. The method according to claim 1, wherein the said paraffin is isobutane which is added in sufficient amount to provide an isobutane concentration in the reactor hydrocarbon of the last stage of at least 50% by volume, the alkylation catalyst is added in sufficient amount to provide a catalyst content of 60-70% by volume on the basis of the total reaction products in the system, the major proportion of the catalyst separated from the reaction product of the last stage is recycled to the first stage of the system, the excess isobutane separated from the reaction products of the last stage is also recycled in at least major part to the first stage, and the recycle isobutane is contacted and mixed with the recycle catalyst prior to introduction of the mixture into the said first stage.

3. In the alkylation of an isoparaffin with an olefin in the presence of sulfuric acid alkylation catalyst of a volume at least about equal to the volume of the total hydrocarbons undergoing reaction in a multi-stage alkylation system operating with once-through flow without recycle of hydrocarbon reaction products, the improvement which comprises introducing the bulk of the isoparaffin premixed with the sulfuric acid alkylation catalyst into the first stage of the alkylation system and flowing the said mixture in a stream serially through the remaining stages of said system splitting the feed of olefin between a plurality of said stages, introducing the olefin into each stage by multipoint addition involving injection of the olefin in finely-divided droplets not exceeding ¼ inch in diameter from a large number in excess of ten injection points spaced widely from each other and throughout a major portion of the reaction mix of each stage with effective agitation adjacent each point of olefin addition, the isoparaffin being supplied in sufficient quantity to provide an isoparaffin concentration in the reacted mix of the last stage of said system of at least 50% by volume on the volume of the total hydrocarbons therein, progressively decreasing the rate of introduction of olefin throughout the said plurality of stages along the line of flow in accordance with the variation in the isoparaffin concentration of said plurality of stages, and controlling the rate of introduction of olefin at each of said plurality of stages so that the rate approaches but does not exceed the linear graph relationship represented by the straight line connecting a point denoting a feed rate of 0.5 volume of olefin per volume of catalyst per hour for an isoparaffin concentration of 80% by volume, with the point denoting a feed rate of 0.05 volume of olefin per volume of catalyst per hour for an isoparaffin concentration of 50% by volume.

4. The method according to claim 3, wherein the catalyst content of the reaction mix in the system is 60-70% by volume, the temperature is 30-60° F., and the $H_2SO_4$ contains less than 1% water.

ARTHUR R. GOLDSBY.
CLAUDE W. WATSON.

REFERENCES CITED

The following references are of record in the file of this patent:

UNITED STATES PATENTS

| Number | Name | Date |
|---|---|---|
| 2,002,394 | Frey | May 21, 1935 |
| 2,222,012 | Amos | Nov. 19, 1940 |
| 2,246,703 | Thiele | June 24, 1941 |
| 2,260,990 | Goldsby et al. | Oct. 28, 1941 |
| 2,311,144 | Wickham | Feb. 16, 1943 |
| 2,322,482 | Stahly | June 27, 1943 |
| 2,366,627 | Kemp | Jan. 2, 1945 |
| 2,374,262 | Anderson | Apr. 24, 1945 |
| 2,379,368 | Matuszak | June 26, 1945 |
| 2,402,905 | Miller | June 25, 1946 |